Feb. 3, 1970   O. R. WALTRIP   3,492,819
MAGNETIC FLUID PRESSURE CONVERTER
Filed Sept. 10, 1968   3 Sheets-Sheet 1
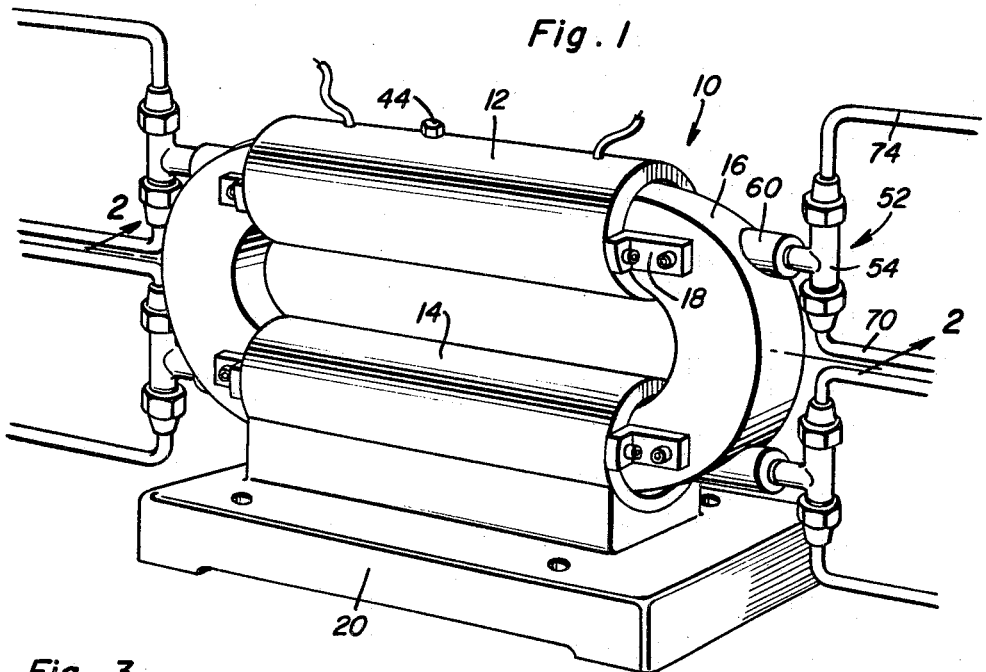
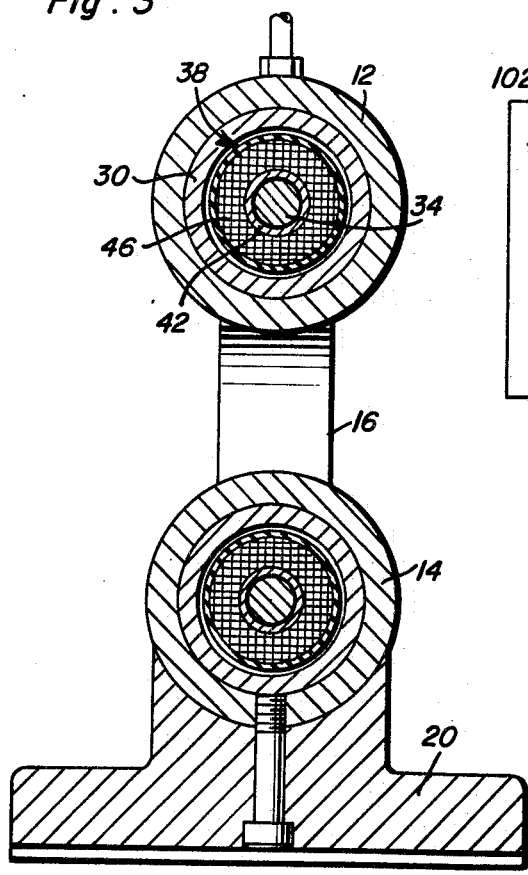
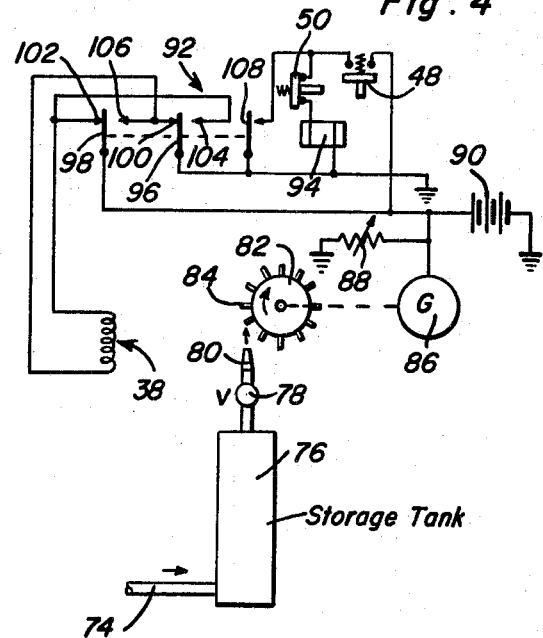
Owen R. Waltrip
INVENTOR.

Feb. 3, 1970  O. R. WALTRIP  3,492,819
MAGNETIC FLUID PRESSURE CONVERTER
Filed Sept. 10, 1968  3 Sheets-Sheet 2

Owen R. Waltrip
INVENTOR.

BY *Clarence A. O'Brien*
*and Harvey B. Jackson*
Attorneys

Feb. 3, 1970          O. R. WALTRIP          3,492,819
MAGNETIC FLUID PRESSURE CONVERTER
Filed Sept. 10, 1968                    3 Sheets-Sheet 3
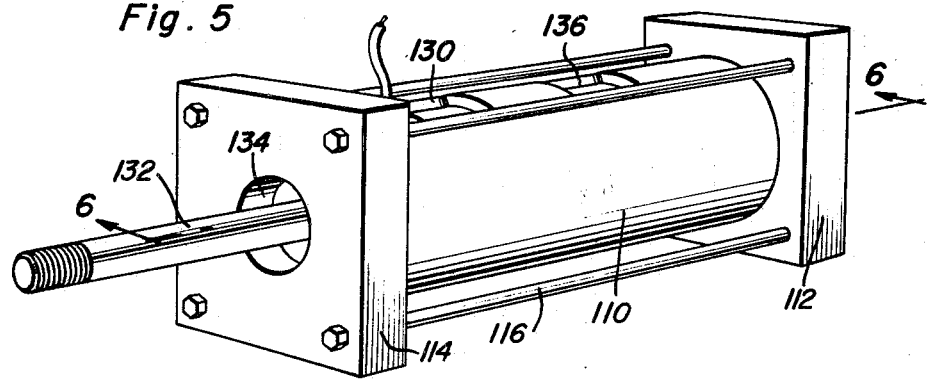
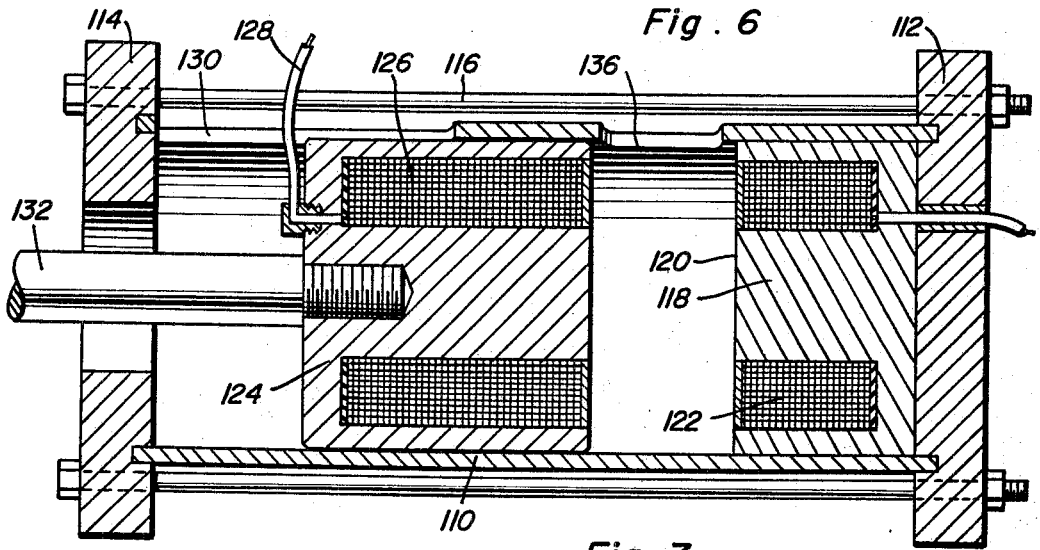
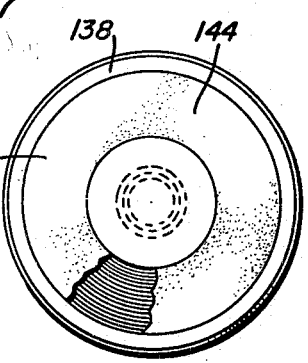
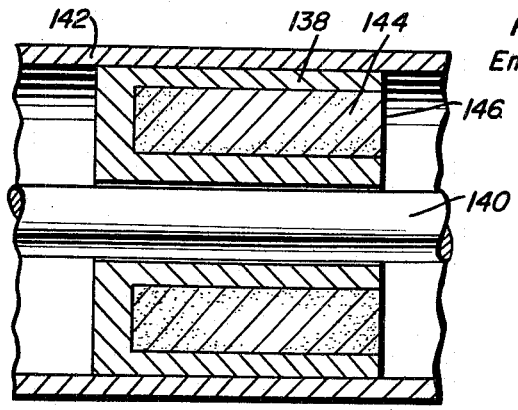
Owen R. Waltrip
INVENTOR.

United States Patent Office 3,492,819
Patented Feb. 3, 1970

3,492,819
MAGNETIC FLUID PRESSURE CONVERTER
Owen R. Waltrip, Roseville, Calif., assignor of twenty-five percent to John Konsonlas, and ten percent each to Paul Lunardi and Willis Hampton, all of Roseville, Calif.
Continuation-in-part of abandoned application Ser. No. 669,323, Sept. 20, 1967. This application Sept. 10, 1968, Ser. No. 758,891
Int. Cl. F16h 41/04; F04b 17/04, 35/04
U.S. Cl. 60—55                                  16 Claims

ABSTRACT OF THE DISCLOSURE

Magneto-motive energy is converted into mechanical energy of a piston by reversing the polarity of an electro-magnetically generated magnetic field, causing reciprocation of the piston relative to a constant magnetic field also acting on the piston. A fluid medium may be compressed by the piston in order to charge a storage tank from which the pressurized fluid is restrictively discharged to drive a turbine driven generator by means of which the output of the converter may be regulated.

This application is a continuation-in-part of my prior copending application U.S. Ser. No. 669,323, filed Sept. 20, 1967, now abandoned.

This invention relates to the conversion of electrical energy into mechanical energy in general and more particularly to an electromagnetic compression unit.

The present invention resides in apparatus for converting electrical energy into mechanical energy by establishing a magnetic field of fixed polarity and constant energy level between spaced magnetic flux emitting pole faces which form motion-limiting stops for a reciprocating magnetic piston. Electromagnetic means establishes another magnetic field having an energy level equal to or greater than that of the constant energy level of the fixed magnetic field, through the magnetic piston causing it to reciprocate between its motion limits. The electromagnetically generated magnetic field is reversed in polarity as the piston approaches the limits of movement in order to maintain the piston reciprocating. The D.C. current supplied to the electromagnetic coil which produces the reversing magnetic field, is regulated in order to control the amount of mechanical energy obtained by reciprocation of the piston.

In one form of the invention, the piston is operative to compress a relatively inert fluid which is stored in a pressurized condition within a tank from which the presurized fluid is restrictivley bled. The pressurized fluid is thus discharged from the tank through a bleed valve and is conducted through a nozzle so as to impinge upon the blades or vanes of a turbine wheel driving an electric generator. The electric generator which may be of the D.C. type together with any other suitable source of D.C. current, is operative through an automatic current-controlled device to energize the electromagnetic coil producing the variable magnetic field which causes reciprocation of the magnetic piston.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing one form of apparatus constructed in accordance with the present invention.

FIGURE 3 is a transverse sectional view taken substantially through a plane indicated by section line 3—3 in FIGURE 2.

FIGURE 4 is a diagrammatic view showing one form of a power regulating control associated with the apparatus illustrated in FIGURES 1–3.

FIGURE 5 is a perspective view showing another form of the invention.

FIGURE 6 is a longitudinal sectional view taken substantially through a plane indicated by section line 6—6 in FIGURE 5.

FIGURE 7 is an end view showing a modified form of piston utilized in another form of the invention.

FIGURE 8 is a partial side sectional view showing the installation of the piston illustrated in FIGURE 7.

Figure 2:
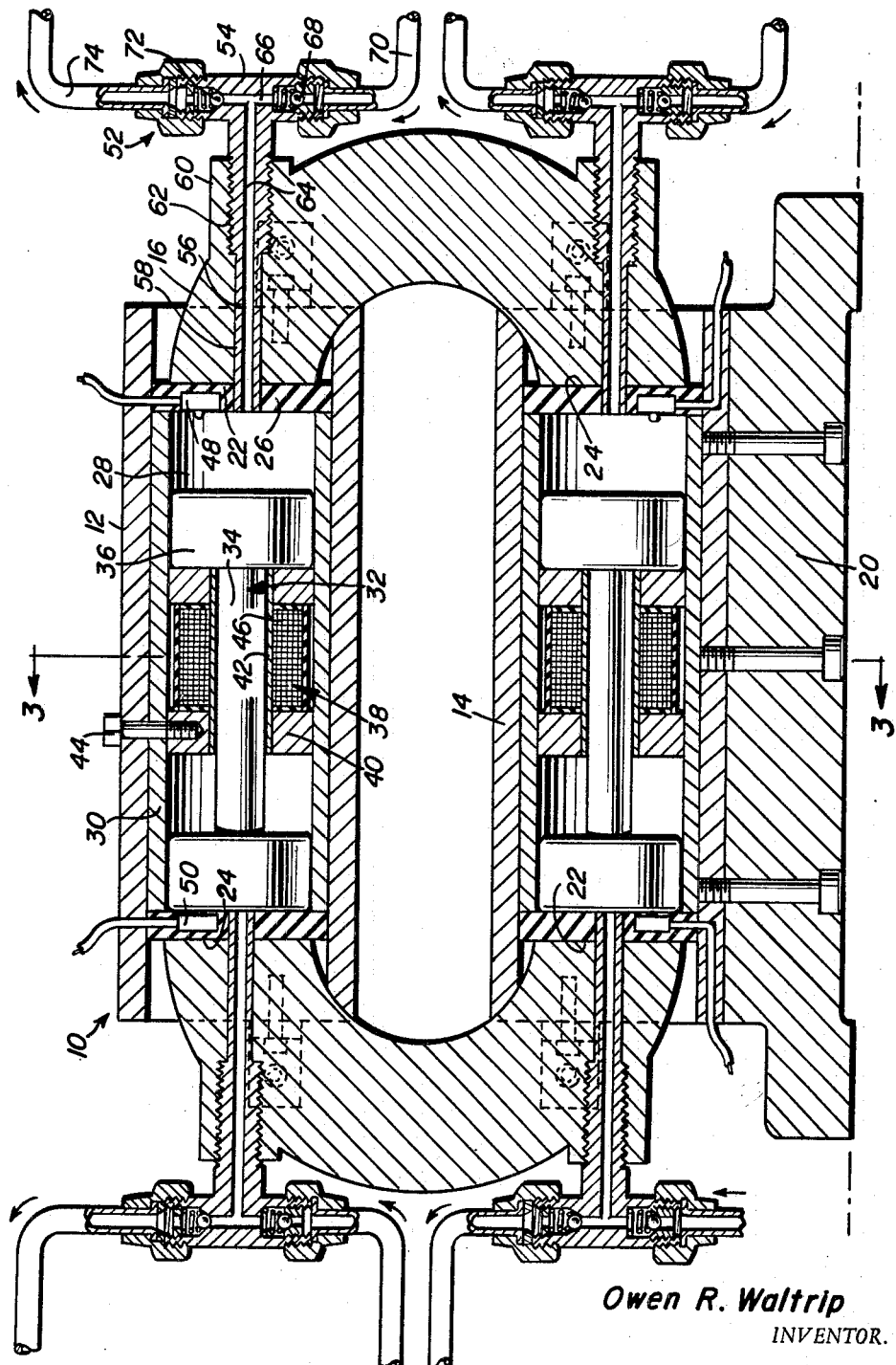
FIGURE 2 is an enlarged longitudinal sectional view taken substantially through a plane indicated by section line 2—2 in FIGURE 1.

Referring now to the drawings in detail, FIGURES 1 through 3 illustrate one embodiment of the present invention generally denoted by reference numeral 10. In the form of the converter illustrated, two parallel spaced cylindrical housings 12 and 14 are shown interconnected by a pair of U-shaped permanent magnets 16 to which the cylindrical housings are connected by any suitable means such as connecting brackets 18. Thus, the cylindrical housings and the permanent magnets form an assembly which may be supported on a base 20 to which the lowermost cylindrical housing 14 is connected. Although one pair of cylindrical housings and permanent magnets are illustrated, it will be appreciated that any number of such assemblies may be utilized in order to produce the desired output.

Referring now to FIGURE 2 in particular, it will be observed that the permanent magnets 16 project into the cylindrical housings 12 and 14 at opposite axial ends presenting flux-emitting pole faces 22 and 24 of opposite polarity. Thus, pole faces of opposite polarity adjacent opposite axial ends within each cylindrical housing establish a fixed magnetic field within the housings of constant strength. The pole faces abut shock-absorbing end walls 26 closing opposite axial ends of a cylindrical chamber 28 formed within the cylindrical housings by tubular liners 30 made of a dielectric material such as glass to confine the magnetic fields therein. Slidably mounted within the chambers 28 are piston assemblies 32 adapted to be reciprocated between limit positions engaging the end walls 26. Each piston assembly includes a magnetic core portion 34 and a pair of large diameter end portions 36 in wiping engagement with the interior surface of the liners 30 so as to form pressure sealed, variable volume chambers on opposite axial sides of the piston assembly. It will therefore be apparent that the axially spaced chambers adjacent the end walls 26 will be alternately expanded and contracted during reciprocation of the piston assembly.

Fixedly mounted within the cylindrical chamber 28 intermediate the end walls 26, is an electromagnetic coil assembly 38. The coil assembly may include a pair of axially spaced end walls 40 interconnected by a tubular coil form 42 through which the piston core 34 slidably extends, at least one of the end walls being fixedly secured to the housing by means of a fastener 44. A solenoid winding 46 is mounted on the coil form 42 and is adapted to be energized by a D.C. current. The coil winding may be constructed in accordance with the solenoid coil section disclosed in my copending application U.S. Ser. No. 750,870, filed Aug. 7, 1968. Thus, when the coil assemblies 38 are energized with D.C. current a magnetic field is established through the magnetic core portion 34 of the piston assembly causing movement of the piston assembly toward one of its limit positions spaced by one of the end walls 26 from one of the flux emitting pole faces 22 and 24 of the permanent magnets 16. When the piston assembly engages the end walls 26, microswitches 48 and 50 are actuated causing a reversal in current flow of the D.C. current supplied to the coil assembly with a corresponding reversal in the polarity of the magnetic field produced thereby. For example, with the piston assembly at one end of its stroke as illustrated in FIGURE 2, the coil assembly 38 is energized with a D.C. current producing a flow of magnetic flux through the piston assembly establishing a pole face at one axial end thereof which is opposite in polarity to the pole face 22 at the right side of the chamber 28 as viewed in FIGURE 2. A magneto-motive force generated by the constant magnetic field of the permanent magnets and the magnetic field of the electromagnetic coil assembly will therefore cause movement of the piston assembly toward the opposite end of its stroke. When the piston assembly reaches the end of its stroke in a right-hand direction, the microswitch 48 is engaged causing a reversal in the D.C. current through the coil assembly 38. The polarity of its magnetic field is thereby reversed so that the adjacent pole faces of the permanent magnet 16 on the right and the piston assembly will be of the same polarity thereby repelling the piston assembly for movement to a limit position at the other end of its stroke as shown in FIGURE 2 engaging the microswitch 50 and causing reversal of the electromagnetically generated magnetic field once again. The microswitches 48 and 50 control the reversal of the electromagnetically generated magnetic field by means of an automatic current control regulator as will be hereafter explained.

A one-way valve assembly 52 is associated with each axial end of each of the cylindrical housings 12 and 14 as shown in FIGURES 1 and 2. Each valve assembly is similar in construction and operation and includes a T-shaped valve body 54 having a tubular portion 56 extending through a bore 58 formed within each permanent magnet from the pole faces 22 and 24 through tubular projections 60 having internally threaded bore portions 62 which threadedly mount the valve bodies. The tubular portion 58 of the valve body extends through the end wall 26 associated therewith so as to establish fluid communication through the passage 64 between a piston chamber 28 and transverse passage 66 in the valve body. A spring-biased check valve 68 closes one end of the passage 66 adapted to communicate with a source of fluid through a conduit 70 upon opening of the check valve 68 when the piston chamber is expanding. Thus, an inert fluid such as helium gas may be drawn into the piston chambers from a common source. When the piston begins its compression stroke, the fluid previously drawn into the piston chamber is compressed closing the check valve 68 and opening the check valve 72 so as to establish fluid communication between the contracting chamber and the outlet conduit 74. The inlet conduit 70 associated with each of the one-way valve assemblies 52 is therefore connected to the source of fluid whereas the outlet conduits 74 are all connected to a storage tank within which the pressurized fluid is stored.

As diagrammatically shown in FIGURE 4, the storage tank 76 to which the outlet conduits 74 are connected, is provided with a bleed valve 78 through which the pressurized fluid is restrictively conducted for discharge from a nozzle 80 associated with a turbine rotor 82 having turbine blades or vanes 84 against which the fluid impinges causing rotation of the turbine rotor. The turbine rotor is drivingly connected to a D.C. generator 86 producing an electrical D.C. output adapted to be regulated by any suitable means such as the variable load resistor 88. The output of the generator together with any other suitable D.C. power supply such as battery 90 form a regulated D.C. current source for energizing the electromagnetic coil assembly 38 as diagrammatically illustrated in FIGURE 4.

Any suitable current reversing control may be utilized in order to effect reversal of current flow from the D.C. source through the electromagnetic coil assembly 38 in response to engagement of the microswitches 48 and 50 by the piston assembly at the ends of its stroke. FIGURE 4 illustrates by way of example only, one possible current reversing control 92 which includes a relay 94 connected to the D.C. source in series with the microswitches 48 and 50. A pair of relay switches 96 and 98 may be associated with the relay coil 94. With the relay coil 94 de-energized as illustrated in FIGURE 4 current will be conducted in one direction through the coil assembly 38, through the relay switches 96 and 98 engaging contacts 100 and 102. When the piston assembly engages the normally open microswitch 48, an energizing circuit is completed through the relay coil 94 displacing the relay switches 96 and 98 to their other operative positions engaging the contacts 104 and 106 so as to reverse the flow of current through the coil assembly. The normally opened relay holding switch 108 is also closed so as to maintain the relay coil 94 energized after the piston begins movement in a return direction permitting the microswitch 48 to open. Thus, at the other end of its stroke, the piston assembly upon opening the normally closed microswitch 50 will de-energize the relay coil 94 so that the relay switches 96 and 98 may return to their normal position and the holding switch 108 opens. A reversal in current flow again occurs, and the relay coil 94 remains de-energized as a new reciprocatory cycle begins.

A basic operating principle of the converter as hereinbefore described in connection with FIGURES 1 through 4, resides in the establishment of a constant and fixed magnetic field which acts upon the magnetic reciprocating piston through which a magnetic field of reversing polarity is established producing a force which varies with movement of the uux conducting piston. The force produced by the variable magnetic field is equal to or greater than that of the constant magnetic field established by the permanent magnets 16 as described in connection with FIGURES 1 through 4. The constant magnetic field could alternatively be produced electromagnetically. Also, instead of electromagnetically producing the magnetic field through the piston assembly by a stationary coil assembly disposed intermediate the ends of the piston stroke, the electromagnetic coil may be mounted within the piston itself. Such an arrangement is illustrated in FIGURES 5 and 6 wherein a cylindrical housing 110 is mounted between a pair of cylinder blocks 112 and 114 which are fixedly spaced from each other by the spacing rods 116. A magnetic core 118 is fixedly mounted within the cylindrical housing 110 at one end abutting the block 112 presenting a flux emitting face 120. A coil winding 122 is mounted on the core and connected to a suitable D.C. current source of constant value so as to establish a constant magnetic field of fixed polarity emanating from the flux emitting pole face 120. Thus, the constant magnetic field established by the coil 122 acts upon a reciprocating magnetic piston member 124. A magnetic field emanating from the piston member 124 produces its reciprocation between the pole face 120 and the block 114. An electromagnetic coil 126 is mounted by the piston 124 for this purpose and is connected to a D.C. source of current by means of the conductors 128 extending through a slot 130 formed in the housing 110. The polarity of the electromagnetically generated magnetic field of the piston is caused to reverse as the piston approaches the ends of its stroke in any suitable manner such as hereinbefore described in connection with the converter 10. Further, in the converter illustrated in FIGURES 5 and 6, the reciprocatory movement of the piston 124 may be transmitted by means of a piston rod 132 extending through an opening 134 formed in the block 114. Also, a vent opening 136 is formed within the housing 110 between the piston member 124 and the stationary magnetic core 118.

Another possible modification of the magneto-motive converter would involve the fixed mounting of the electromagnetic coil generating the magnetic field of reversing polarity adjacent the opposite limit positions of the piston assembly with the constant magnetic field being established by a permanent magnet mounted by the piston itself. In the latter arrangement, the piston may be in the form of an annular permanent magnet 138 as shown in FIGURES 7 and 8 mounted on a piston rod 140. The annular magnet thus forms a piston which is slidably mounted within the tubular housing 142 and encloses a body of magnetic compound material 144 to form a flux emitting face 146 from which a constant magnetic field is established within the tubular member 142. The reversing magnetic field is established at the axial limit positions of the magnetic piston 138 cooperating therewith to operate in a manner similar to that hereinbefore described in connection with FIGURES 5 and 6, or FIGURES 1 through 4 except for the rearrangement of the constant and reversing magnetic fields.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a piston, means for limiting movement of the piston between limit positions, magnetic means for establishing a constant magnetic field acting on the piston, electromagnetic means for establishing a variable force producing magnetic field causing reciprocatory movement of the piston between said limit positions, a source of D.C. voltage for energizing the electromagnetic means and means connected to said source for reversing the polarity of said variable magnetic field in response to approach of the piston to said limit positions to control said movement of the piston.

2. The combination of claim 13 including means for storing said fluid compressed by the piston under pressure, bleed valve means for restrictively discharging the fluid from said fluid storing means and turbine means driven by said fluid discharged by the bleed valve means.

3. The combination of claim 2 wherein said electromagnetic means comprises a solenoid coil assembly fixedly mounted by the movement limiting means between the limit positions, a source of D.C. current connected to the coil assembly, switch means mounted at said limit positions for engagement by the piston and current control means connected to the switch means for reversing the direction of current through the coil assembly in response to engagement of said switch means by the piston.

4. The combination of claim 3 wherein said fluid pressure means comprises a source of fluid, dielectric means forming a pressure sealed chamber between the piston and the pole face of the permanent magnet, an outlet conduit and one-way valve means for conducting fluid flow to the chamber from said source while the chamber is expanding and fluid flow to the outlet conduit from the chamber while contracting.

5. In combination, a piston, means for limiting movement of the piston between limit positions, means for establishing a constant magnetic field acting on the piston, electromagnetic means for establishing a variable force producing magnetic field causing reciprocatory movement of the piston between said limit positions, and means for reversing the polarity of said variable magnetic field in response to approach of the piston to said limit positions, said electromagnetic means comprising a solenoid coil assembly fixedly mounted by the movement limiting means between the limit positions, a source of D.C. current connected to the coil assembly, switch means mounted at said limit positions for engagement by the piston and current control means connected to the switch means for reversing the direction of current through the coil assembly in response to engagement of said switch means by the piston.

6. The combination of claim 5 wherein said means for establishing a constant magnetic field comprises a permanent magnet having a pole face fixedly mounted by the movement limiting means.

7. The combination of claim 1 wherein said electromagnetic means comprises a coil assembly mounted on the piston, and said means for reversing the polarity including switch means mounted at said limit positions for engagement by the piston and current control means connected to the switch means for reversing the direction of current through the coil assembly in response to engagement of said switch means by the piston.

8. The combination of claim 7 wherein said means for establishing a fixed magnetic field comprises an electromagnet fixedly mounted at said one of the limit positions and connected to the source of D.C. current.

9. The combination of claim 1 wherein said means for establishing a fixed magnetic field comprises an electromagnet fixedly mounted at said one of the limit positions.

10. The combination of claim 1 including a source of fluid, dielectric means forming a pressure sealed chamber between the piston and said means for establishing the fixed magnetic field, an outlet conduit and one-way valve means for conducting fluid flow to the chamber from said source while the chamber is expanding and fluid flow to the outlet conduit from the chamber while contracting.

11. The combination of claim 10 including means connected to the outlet conduit for storing said fluid compressed by the piston under pressure, bleed valve means for restrictively discharging the fluid from said fluid storing means and turbine means driven by said fluid discharged by the bleed valve means.

12. In combination, a piston, means for limiting movement of the piston between limit positions, means for establishing a constant magnetic field acting on the piston, electromagnetic means for establishing a variable force producing magnetic field causing reciprocatory movement of the piston between said limit positions, and means for reversing the polarity of said variable magnetic field in response to approach of the piston to said limit positions, said means for establishing a constant magnetic field comprises a permanent magnet having a pole face fixedly mounted by the movement limiting means.

13. The combination of claim 12 including fluid pressure means responsive to movement of the piston toward said limit positions for compressing fluid.

14. The combination of claim 1 wherein said means for establishing a constant magnetic field comprises a permanent magnet having a pole face fixedly mounted by the piston.

15. The combination of claim 14 wherein said electromagnetic means comprises a coil assembly mounted by the movement limiting means, a source of D.C. current connected to the coil assembly, switch means mounted at said limit positions for engagement by the piston and current control means connected to the switch means for reversing the direction of current through the coil assembly in response to engagement of said switch means by the movement limiting means.

16. The combination of claim 1 including means for storing fluid compressed by the piston means, and fluid driven generator means operatively connected to the fluid storing means for regulating energization of the electromagnetic means by the source of D.C. voltage.

References Cited

UNITED STATES PATENTS

| 1,247,520 | 11/1917 | Fessenden | 60—55 |
| 2,690,128 | 9/1954 | Basilewsky | 103—53 |
| 2,701,331 | 2/1955 | Holst | 103—53 XR |
| 3,116,695 | 1/1964 | Faller | 103—53 |

EDGAR W. GEOGHEGAN, Primary Examiner

U.S. Cl. X.R.

60—57; 103—53